United States Patent [19]

Arai et al.

[11] Patent Number: 5,102,269
[45] Date of Patent: Apr. 7, 1992

[54] INSERT CUTTER

[75] Inventors: Tatsuo Arai; Takayoshi Saito; Hiroaki Hayashizaki, all of Tokyo; Toru Narita, Anpachi, all of Japan

[73] Assignee: Mitsubishi Materials Corporation, Tokyo, Japan

[21] Appl. No.: 540,203

[22] Filed: Jun. 19, 1990

[30] Foreign Application Priority Data

Jun. 20, 1989 [JP] Japan .................................. 1-157847
Mar. 29, 1990 [JP] Japan .................................. 2-33018
Jun. 4, 1990 [JP] Japan .................................. 2-145940

[51] Int. Cl.$^5$ ................................................. B23C 5/24
[52] U.S. Cl. ......................................... 407/41; 407/38; 407/45
[58] Field of Search ....................... 407/22, 36-39, 407/41, 77, 83, 87, 49, 50, 52, 94; 408/154, 156, 714

[56] References Cited

U.S. PATENT DOCUMENTS

| | | | |
|---|---|---|---|
| 2,284,768 | 6/1942 | Ramsdell | 408/156 |
| 3,487,535 | 1/1970 | Begle | 29/464 |
| 4,329,091 | 5/1982 | Erkfritz | 407/50 X |
| 4,566,826 | 1/1986 | Dickinson | 407/41 X |
| 4,606,680 | 8/1986 | Striegl | 408/714 X |
| 4,708,536 | 11/1987 | Sullivan | 407/50 X |
| 4,808,044 | 2/1989 | Tsujimura et al. | 407/41 X |

FOREIGN PATENT DOCUMENTS 2094446 2/1972 France .

Primary Examiner—Larry I. Schwartz
Assistant Examiner—Julie R. Daulton
Attorney, Agent, or Firm—Cushman, Darby & Cushman

[57] ABSTRACT

There is disclosed an insert cutter which includes a tool body having a plurality of mounting recesses formed in an outer peripheral surface thereof and a plurality of cutter inserts each releasably secured to a respective one of the mounting recesses and a plurality of pressing members each received in a respective one of the holes. Each of the mounting recesses defines an abutment face facing axially forwardly of the tool body. The tool body has a plurality of holes formed in the outer peripheral surface thereof and extending radially inwardly thereof. Each of the holes has an inner wall and is displaced rearwardly of the tool body from a respective one of the mounting recesses. Each of the cutter inserts has a face held in contact with the abutment face of a respective one of the mounting recesses. Each pressing member is pressed against the inner wall of the hole, whereby that portion of the tool body between the hole and the mounting recess is elastically deformed.

12 Claims, 14 Drawing Sheets

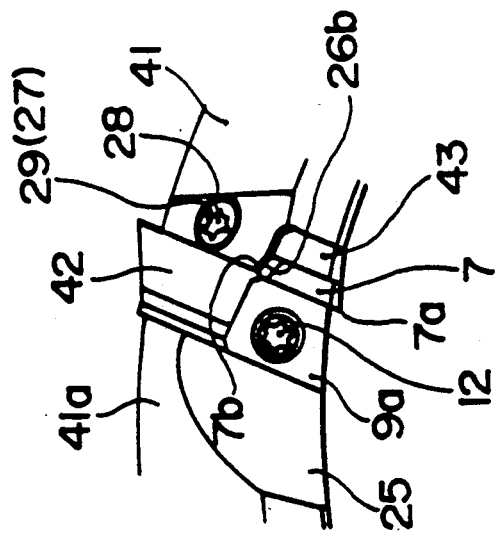
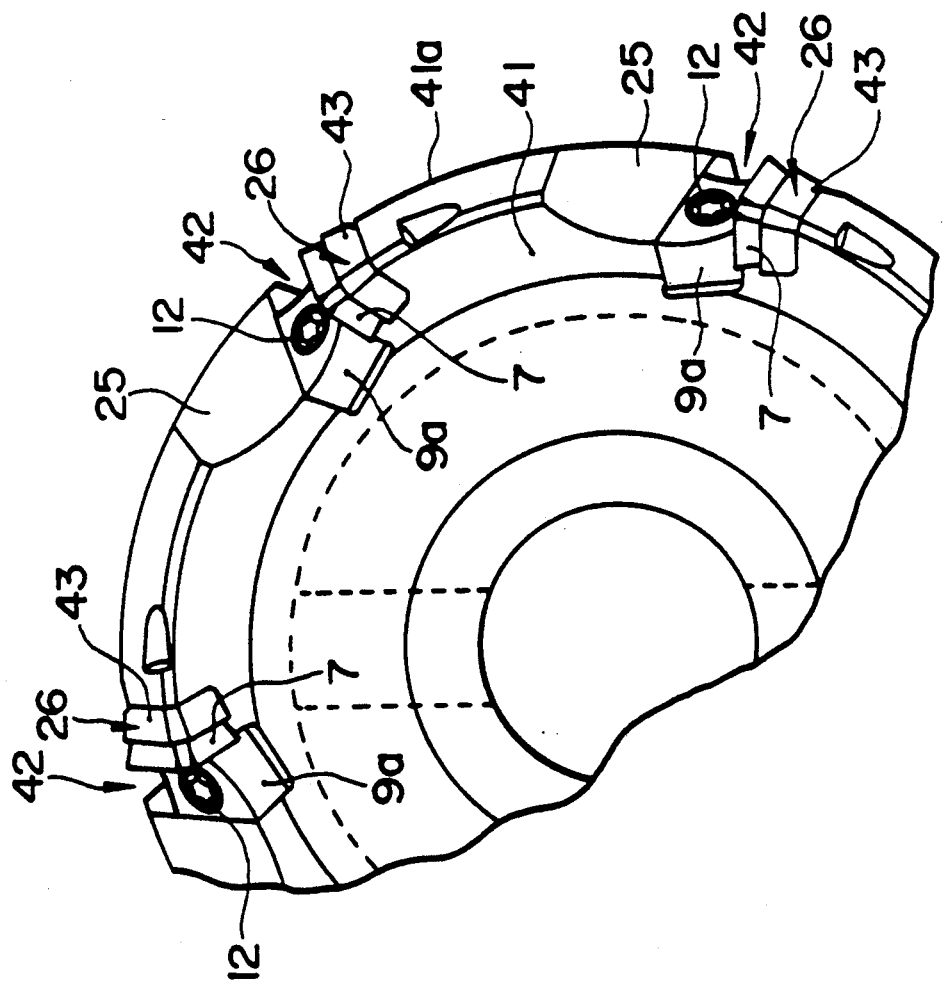

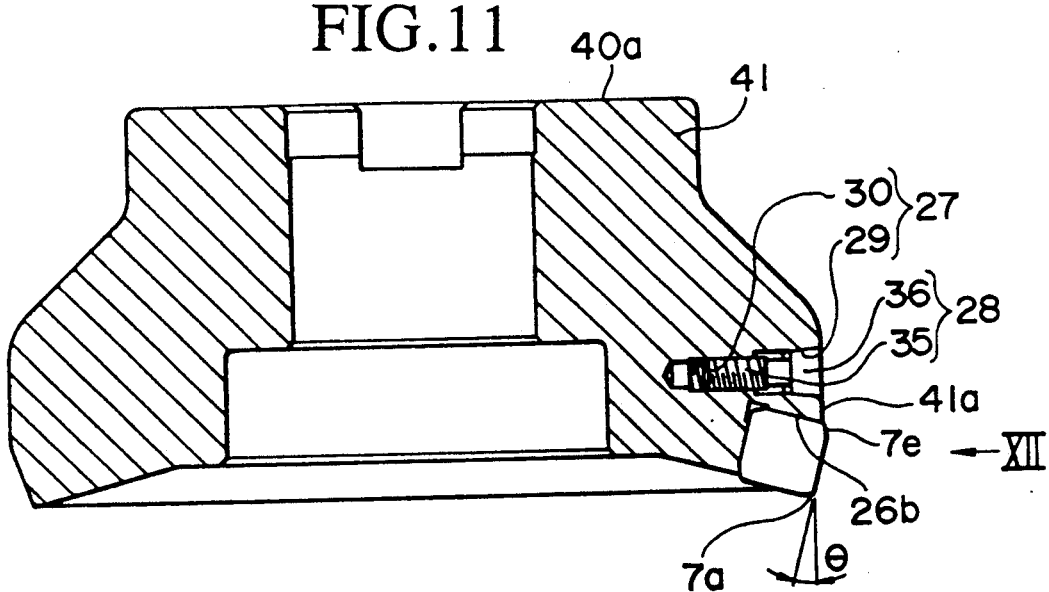
FIG. 11
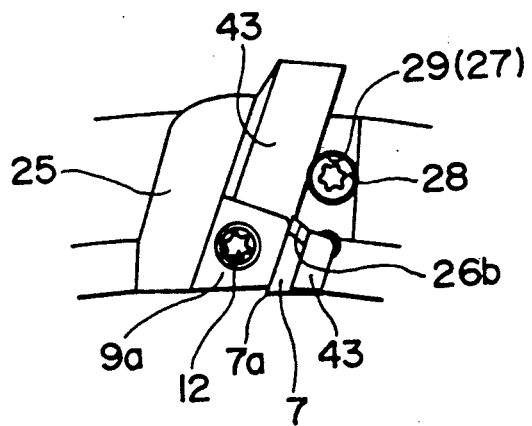
FIG. 12
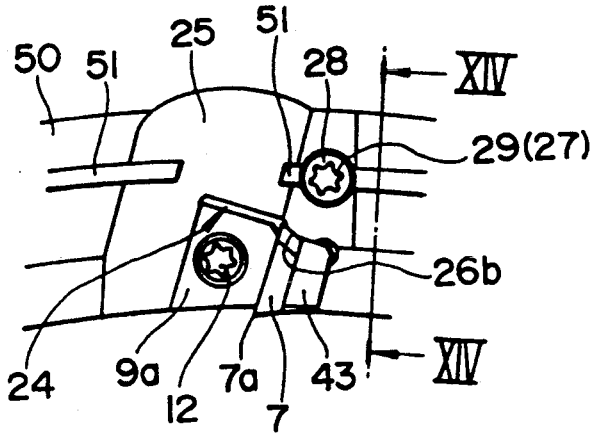
FIG. 13
FIG. 14

INSERT CUTTER

BACKGROUND OF THE INVENTION

1. Field of the Invention

The present invention relates to an insert cutter having a plurality of indexable cutter inserts releasably attached to a peripheral surface of a tool body.

2. Prior Art

FIGS. 29 and 30 depict one conventional face milling cutter of the aforesaid type, which includes a tool body 2 having a plurality of pockets 5 formed in an outer peripheral surface 4 thereof in circumferentially equally spaced relation to one another and opening to a forward end face 3 thereof. An insert-receiving recess 6 is formed in that wall of each pocket facing in a direction of rotation of the tool body 2. An indexable cutter insert 7 formed of cemented carbide is disposed on the insert-receiving recess 6 with a support member 8 interposed therebetween, and the insert 7 and the support member 8 are releasably secured to the insert-receiving recess 6 by means of first and second wedge members 9a and 9b.

In the aforesaid cutter, it is indispensable to make equal the distances L each defined between the corner cutting edge 7a of a respective insert 7 and the end face 2a of the tool body in order to ensure superior machining precision. However, in practice, although inserts of an identical shape and size are employed, the distances L vary due to the manufacturing errors regarding the insert-receiving recesses 6 and the inserts 7. Therefore, the distances L must be adjusted when mounting the inserts 7. This adjustment has been conventionally conducted by preparing a plurality of support members 8 having recesses 10 and wall portions of different sizes and selecting appropriate support members among them.

More specifically, a plurality of support members 8 having wall portions of various lengths S are first prepared. The lengths S usually range from 6 micrometers to 8 micrometers. Thereafter, the support members 8 having the same length S are selected, and the insert 7 is attached to the insert-receiving recess 10 of each of the selected support members 8. Then, each support member 8 is received by a respective insert-receiving recess 6 with its end face 8a mated with the wall 6a of the recess 6. Subsequently, clamp screws 11 and 12 are inserted through the first and second wedge members 9a and 9b, respectively, and are tightened loosely to hold each insert 7 and support member 8 lightly. In this condition, one of the inserts 7 is selected as a reference insert 7m, and if the distance L for a prescribed insert 7 to be checked is smaller than that for the reference insert 7m, the support member 8 for the insert is replaced by a support member 8 having a greater length S. On the other hand, if the distance L is greater than that for the reference insert 7m, the support member 8 is replaced by a support member 8 having a smaller length S. Then, the distance L is measured again, and these procedures are repeated until the distances L for all of the inserts to be checked become equal to the distance L for the reference insert 7m. Finally, all of the inserts 7 and the support members 8 are firmly secured by means of the wedge members 9a and 9b, so that the adjustment of the axial run-out for the inserts 7 is completed.

However, since the inserts 7 and the support members 8 must be repeatedly removed and mounted, the above adjustment requires a prolonged time, so that the mounting operation of the inserts is not efficient.

In addition, inasmuch as many support members of various sizes must be prepared, the number of parts is increased, resulting in a laborious maintenance of parts and an increase of maintenance costs.

SUMMARY OF THE INVENTION

It is therefore an object of the present invention to provide an insert cutter in which the axial run-out of the inserts can be adjusted very easily so that the efficiency for the adjustment operation can be substantially improved.

According to the present invention, there is provided an insert cutter comprising a tool body having an axis of rotation therethrough and having a plurality of mounting recesses formed in an outer peripheral surface thereof, each of the mounting recesses defining an abutment face facing axially forwardly of the tool body; the tool body having a plurality of holes formed in the outer peripheral surface thereof and extending radially inwardly thereof, each of the holes having an inner wall and being displaced axially rearwardly of the tool body from a respective one of the mounting recesses; a plurality of indexable cutter inserts each releasably secured to a respective one of the mounting recesses, each of the cutter inserts having a face held in contact with the abutment face of a respective one of the mounting recesses; and a plurality of pressing members each received in a respective one of the holes so as to be pressed against the inner wall of the hole, whereby that portion of the tool body between the hole and the mounting recess is elastically deformed.

BRIEF DESCRIPTION OF THE DRAWINGS

FIG. 7 is an end view of a part of the cutter of FIG. 1 seen in the direction indicated by the arrow VII in FIG. 6;

FIG. 8 is a side-elevational view of a part of the cutter of FIG. 6 seen in the direction indicated by the arrow VIII in FIG. 6;

FIG. 11 is a cross-sectional view showing a modification of the cutter of FIG. 6;

FIG. 12 is a side-elevational view showing a part of the cutter of FIG. 11 as seen in the direction indicated by the arrow XII in FIG. 11;

FIG. 13 is a side-elevational view showing another modification of the cutter of FIG. 6;

FIG. 14 is a cross-sectional view taken along the line XIV—XIV in FIG. 13;

DESCRIPTION OF THE PREFERRED EMBODIMENTS OF THE INVENTION

FIGS. 1 to 5 depict a face milling cutter in accordance with a first embodiment of the invention, in which the same parts as those of the aforesaid conventional cutter are designated by the same numerals to avoid their explanation.

Figure 1:
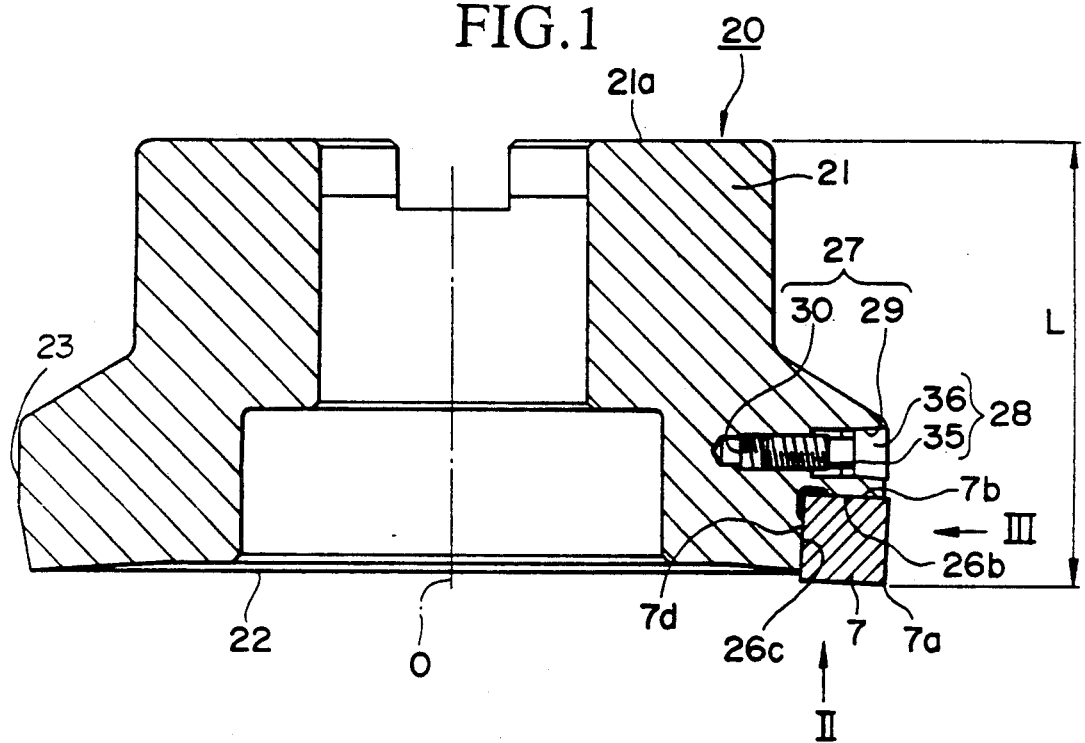
FIG. 1 is a cross-sectional view of a face milling cutter in accordance with a first embodiment of the present invention.
Figure 2:
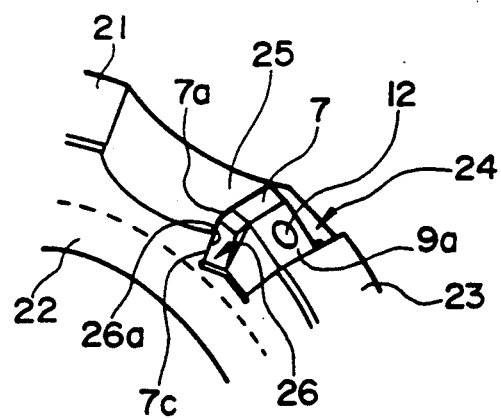
FIG. 2 is an end view of a part of the cutter of FIG. 1 seen in the direction indicated by the arrow II in FIG. 1.
Figure 4:
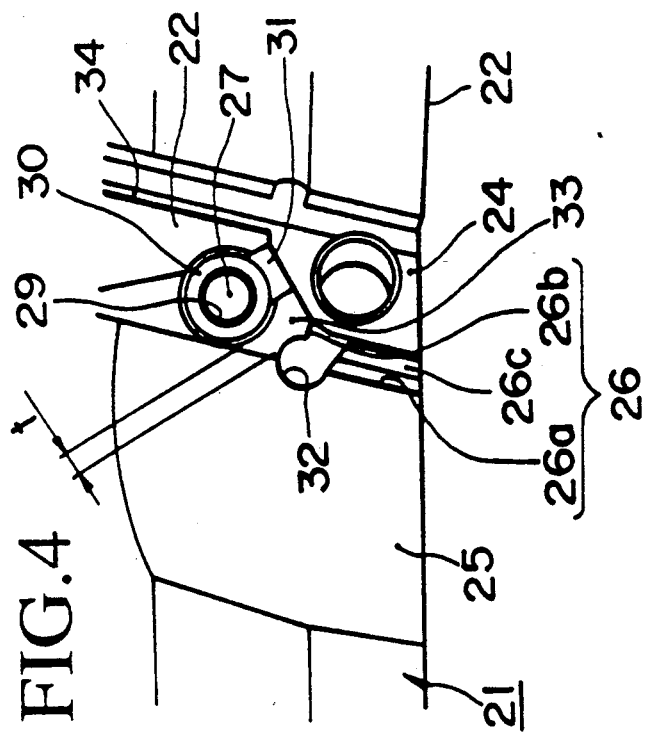
FIG. 4 is a view similar to FIG. 3, but showing the state in which the insert and other parts are removed from the tool body.
Figure 3:
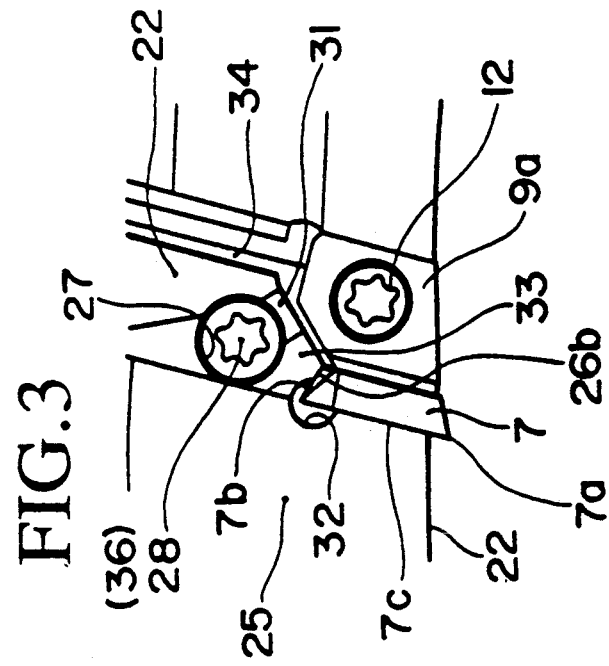
FIG. 3 is a side-elevational view of a part of the cutter of FIG. 1 as seen in the direction indicated by the arrow III in FIG. 1.

As shown in FIGS. 1 and 2, the face milling cutter of the present embodiment, generally designated by 20, comprises a tool body 21 having a plurality of chip pockets 25 formed in an outer peripheral surface 23 thereof in circumferentially equally spaced relation to one another and opening to a forward end face 22 thereof. A mounting recess 24 is formed in that wall of each pocket facing in a direction of rotation of the tool body 21, and an insert-receiving recess 26 or seat is formed in the wall of the mounting recess 24 which is disposed adjacent to the pocket 25. An indexable cutter insert 7 of cemented carbide in the form of a generally square plate is received in the insert-receiving recess 26 and secured thereto by means of a wedge member 9a, which is secured to the mounting recess 24 by a clamp screw 12.

As shown in FIGS. 1 to 4, each insert-receiving recess 26 has a bottom 26a held in contact with an upper face 7a of the insert 7, an abutment face 26b facing forwardly of the tool body, and a wall 26c facing radially outwardly of the tool body. The abutment face 26b is held in intimate contact with a side face 7b of the insert 7 which faces axially rearwardly of the tool body, while the wall 26c is held in intimate contact with a side face body, whereby the axial and radial position of the insert is determined.

In addition, the tool body 21 has a plurality of holes 27 of a circular cross-section extending radially inwardly thereof and formed in the outer peripheral surface thereof in circumferentially spaced relation to one another. Each hole 27 is disposed at a position spaced a prescribed distance rearwardly of the tool body from the abutment face 26b of a respective one of the mounting recesses 24, and includes a tapered portion 29 formed at its outermost end so as to taper radially inwardly of the tool body and an internally threaded portion 30 formed coaxially with the tapered portion so as to extend inwardly from the tapered portion 29. A pressing member in the form of an adjusting screw 28 is inserted in each hole 27 and screwed into the internally threaded portion 30 thereof.

More specifically, the tapered portion 29 of each hole 27 is formed to have a cut-out at its outermost end in such a manner that a part of its periphery reaches a respective chip pocket 25. In addition, a groove 31, which opens at its one end to the tapered portion 29 and at its other end to the mounting recess 24, is formed adjacent to the tapered portion 29 in such a manner that it is generally parallel to the abutment face 26b of the insert-receiving recess 26. Furthermore, a clearance portion 32 is formed at one end of the abutment face 26b of the insert-receiving recess 26 for preventing the marginal ridgeline of the insert 7 from contacting the tool body. With the provision of the groove 31 and the clearance 32, a convex wall portion 33 protruding with respect to the bottom of the mounting recess 24 is formed on that portion of the insert-receiving recess 26 disposed between the abutment face 26b and the tapered portion 29 of the hole 27. Furthermore, a groove 34 opening to the mounting recess 24 is formed behind each hole 29.

Each adjusting screw 28 includes an externally threaded portion 35 threadedly engaged with the internally threaded portion 30 of the hole 27 and a pressing portion 36 formed coaxial therewith and having an outer peripheral surface tapering toward the externally threaded portion 35. The tapering angle for the pressing portion 36 is determined so as to be equal to or slightly greater than that for the tapered portion 29 of the hole 27.

In the face milling cutter as described above, the distances L can be independently adjusted by operating the adjusting screws 28 when securing the inserts 7 to the insert-receiving recesses 26 of the tool body 20.

More specifically, for securing the inserts 7 to the tool body 21, each adjusting screw 28 is first inserted in the hole 27 and screwed into the internally threaded portion 30 of the hole 27 to bring the tapered outer peripheral surface of the pressing portion 36 into contact with the inner wall of the tapered portion 29 at an appropriate strength.

Thereafter, the insert 7 is inserted in the insert-receiving recess 26 so that its side face 7b is held in contact with the abutment face 26b of the insert-receiving recess 26, and then the clamp screw 12, inserted in the wedge member 9a, is moderately screwed. As a result, the insert 7 is slightly clamped between the wedge member 9a and the bottom 26a of the insert-receiving recess 26.

After the completion of the above procedures, the tool body 21 is placed on a surface table with its mounting face 21a disposed so as to face downwardly, and the differences between the distances L for the inserts are measured using measuring means such as a dial gauge.

Then, the insert 7, of which distance L is greatest, is selected as a reference insert 7m, and the distances L for the other inserts 7 are adjusted so as to be equal to the distance L for the reference insert 7m by tightening the adjusting screws 28.

More specifically, when the adjusting screw 28 is tightened, the pressing portion 36 is brought into pressing engagement with the inner wall of the tapered portion 29 of the hole 27 to enlarge the tapered portion 29, so that the convex wall portion 33 formed between the tapered portion 29 and the abutment face 26b is elastically deformed. As a result, the abutment face 26b of the insert-receiving recess 26 is deformed forwardly of the tool body, and hence the insert 7 is urged forwardly of the tool body, so that the corresponding distance L is increased. Thus, the distances L for the inserts 7 can be adjusted by changing the tightening amount of each adjusting screw 28 depending upon deviation from the distance L for the reference insert 7m.

In the foregoing, if the insert 7 to be adjusted is caused to protrude more forwardly than the reference insert 7m, the force for the pressing portion 36 to press the inner wall of the tapered hole portion 29 is released by loosening the adjusting screw 28. Namely, when the adjusting screw 28 is loosened, the convex wall portion 33 is caused to move rearwardly of the tool body, so that the abutment face 26b is restored rearwardly of the tool body. Thereafter, the insert 7 is pressed rearwardly of the tool body until the side face 7b is brought into intimate contact with the abutment face 26b, so that the distance can be reduced.

After the distances L are adjusted equal to each other by operating the adjusting screws 28, the clamp screws 12 are further tightened to secure the inserts 7 firmly. Thus, all of the inserts 7 can be secured to the tool body 21 in such a manner that the distances L therefor are equal to one another.

Figure 5:
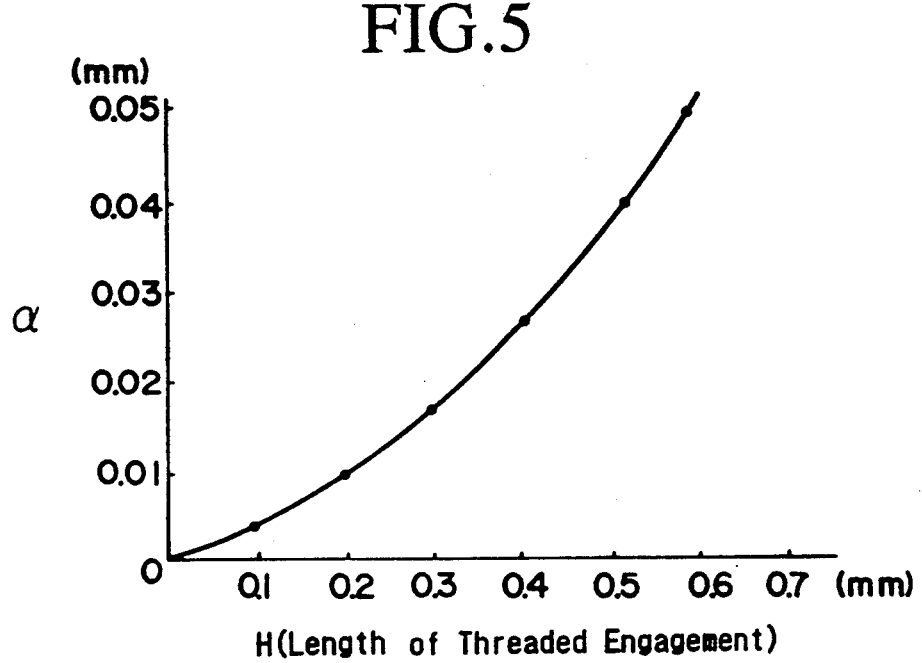
FIG. 5 is a graph showing the relationship between the length of threaded engagement and the run-out of the insets.
Figure 6:
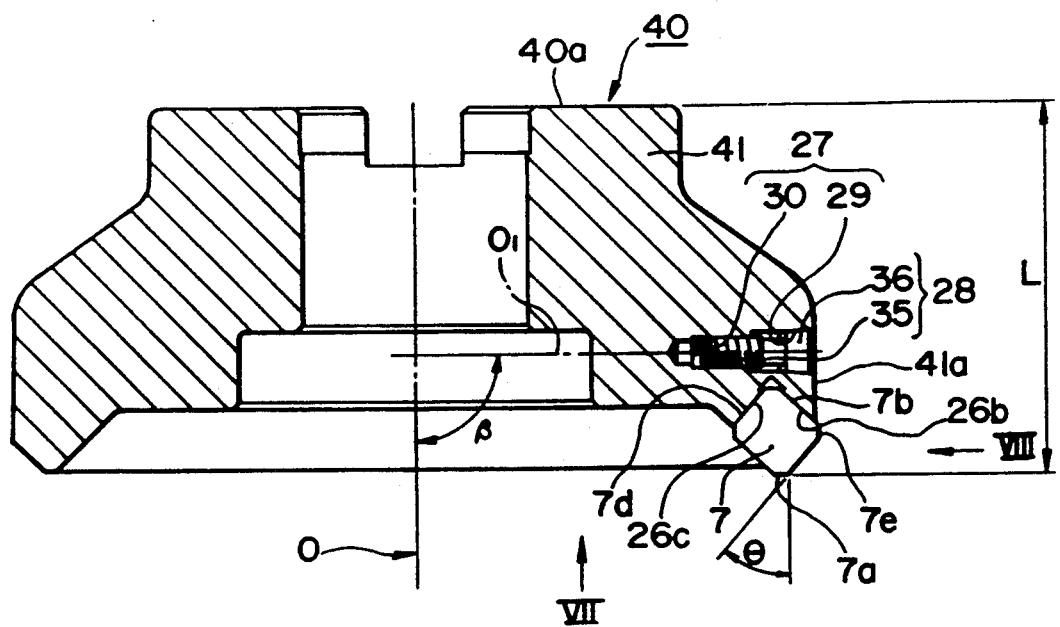
FIG. 6 is a cross-sectional view of a face milling cutter in accordance with a second embodiment of the invention.

In the foregoing, the adjusting range for the distances L can be variously changed by modifying the diameter of the external threads of the adjusting screws 28, the width t of the convex wall portion 33 (FIG. 4), the inner diameter of the tapered portion 29 or the other configuration of the portion surrounding the insert-receiving recess 26. FIG. 5 is a graph showing the relationship between the amount of threaded engagement (H) of the adjusting screw 28 and the amount of adjustment a of the distances L. In this illustrated example, the tapering angle for the pressing portion 36 of the adjusting screw 28, the width t of the convex wall portion 33, and the diameter of the internal threads of the hole 27 and external threads of the screw 28 were set to 10°, 2 mm and 5 mm, respectively. As will be seen from FIG. 5, the distances L can be adjusted by about 0.05 mm when the amount of threaded engagement (H) of the adjusting screw 28 is about 0.6 mm, and the distances L can be adjusted on the unit of about 0.01 mm As described above, in the face milling cutter 20 of the present embodiment, the distances L between the inserts 7 and the mounting face 21a can be increased or decreased by changing the tightening amounts of the adjusting screws 28 to change the positions of the abutment faces 26b. Therefore, the adjusting operation of the axial run-out of the inserts 7 can be easily conducted, and the time required to secure the inserts to the tool body 21 can be reduced, so that the working efficiency can be substantially improved.

In addition, since it is not necessary to prepare a great number of support members of various sizes, the maintenance of parts becomes easy, resulting in a substantial reduction in the maintenance costs.

Furthermore, a part of the periphery of the tapered portion 29 is formed to open to the chip pocket 25, and the groove 31 opening to the hole 27 is formed to define a cut-out at the outermost end of the tapered portion 30. Therefore, a sufficient amount of elastic deformation of the abutment face 26b can be ensured by tightening the adjusting screw 28. However, if the abutment face 26b can be sufficiently deformed, for example, by setting the diameter of the adjusting screw 28 to a sufficiently large value, or setting the width t between the inner wall of the tapered portion 30 and the abutment face 26b to a small value, it is not necessary to provide the groove 31.

FIGS. 6 to 9 depict another face milling cutter in accordance with a second embodiment of the invention, in which the insert 7 is secured to the tool body so as to have a prescribed corner angle $\theta$.

The face milling cutter, designated by 40, includes a tool body 41 having a plurality of mounting recesses 42 formed in an outer peripheral surface of a forward end portion thereof. An insert-receiving recess 26 is formed in that wall of each mounting recess 42 facing in the direction of rotation of the tool body, and an indexable cutter insert 7 is received thereon with a seat member 43 interposed therebetween. In the illustrated example, the corner angle $\theta$ of the insert 7 is set to 45°. A wedge member 9a is received in each of the mounting recesses 42 to press each insert 7 against the seat member 43 to thereby hold the insert 7 in position.

The cylindrical outer peripheral surface 41a of the tool body 41 is formed to be shifted radially inwardly of the tool body from the outermost end 7e of the insert 7. As is the case with the previous embodiment, a plurality of holes 27, each comprised of the tapered portion 29 and the internally threaded portion 30, are formed in the outer peripheral surface 41a so as to correspond to the insert-receiving recesses 26, respectively, and a plurality of adjusting screws 28, each comprised of the externally threaded portion 35 and the tapered pressing portion 36, are accommodated in the holes 27, respectively. In the illustrated example, the angle $\beta$ defined between the axis $O_1$ of the tapered portion 29 and the axis 0 of the tool body 40 is set to about 90°.

In addition, each mounting recess 42 extends to a position shifted axially rearwardly of the tool body from the rear end of the chip pocket 25, and the tapered portion 29 of each hole 27 has such a cut-out at its periphery as to open to the mounting recess 42.

In the face milling cutter 40 described above, when the pressing portion 36 of the adjusting screw 28 is brought into pressing engagement with the wall of the tapered portion 29, the periphery of the hole 27 is elastically deformed, and the position of the abutment face 26b, with which the side face 7b of the insert 7 is held in intimate contact, is changed. Accordingly, the distances L between the inserts 7 and the mounting face 40a of the tool body can be adjusted only by changing the tightening amounts of the adjusting screws 28.

In addition, in the present embodiment, the cylindrical outer peripheral surface 41a of the tool body 41 is formed to be shifted radially inwardly of the tool body from the outermost end 7e of the insert 7. Therefore, the holes 27 and the adjusting screws 28 can be designed relatively freely, and when cutting a workpiece W having a corner C as shown in FIG. 9, the tool body 40 can be caused to approach the corner C sufficiently to minimize the width D of the uncut portion.

Figure 10:
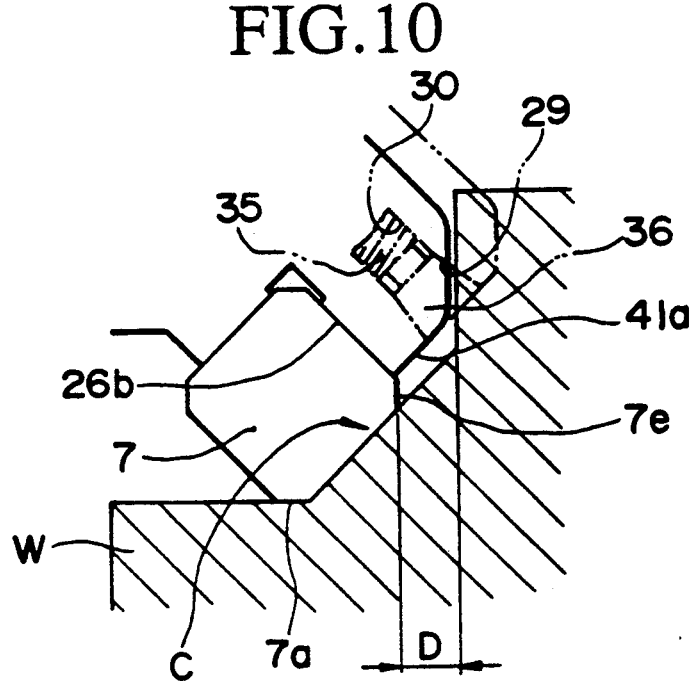
FIG. 10 is a schematic view of a cutter in which an adjusting mechanism of the invention is attached to a conventional face milling cutter.

More specifically, as shown in FIG. 10, if that portion of the outer peripheral surface 41a of the tool body 41 which is displaced axially rearwardly of the tool body from the inserts 7 is formed into a conical shape diverging axially rearwardly of the tool body, the outer peripheral surface 41a protrudes radially outwardly of the tool body from the outermost ends 7e of the inserts 7. Therefore, the width D of the uncut portion is increased. In addition, as indicated by the two-dot chain line in FIG. 10, it is preferable to provide the holes 27 and the adjusting screws 28 sufficiently near the abutment faces 26b in order to ensure a greater adjusting range of the distances L. However, as shown in FIG. 10, the large-diameter portion of the tool body is even enlarged, so that the width D of the uncut portion is unduly increased. In addition, if smaller adjusting screws 28 or the like are employed to reduce the width D of the uncut portion, the adjusting range of the distances L becomes insufficient.

Figure 9:
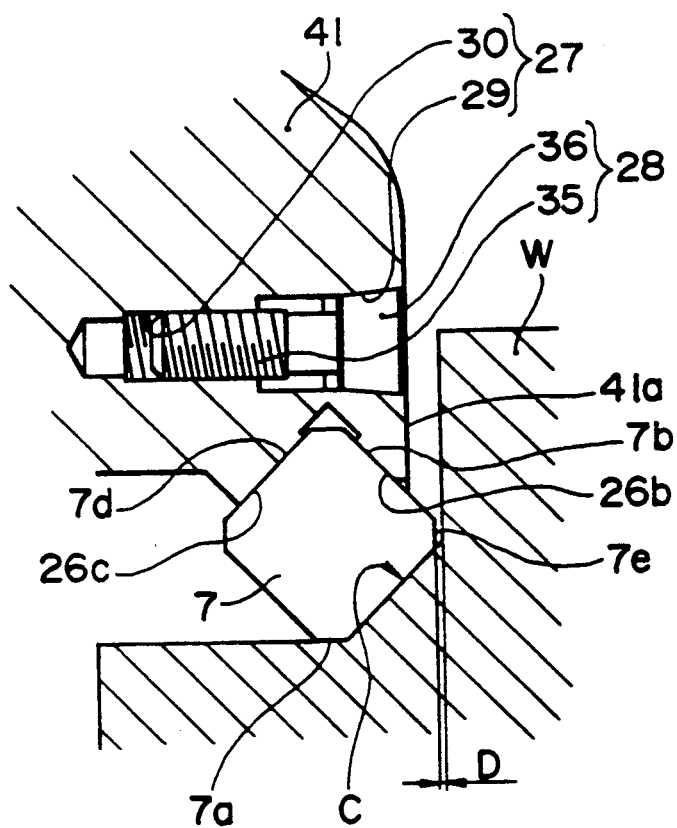
FIG. 9 is an enlarged view showing the forward end portion of the cutter body of FIG. 6.

In contrast, in the embodiment shown in FIG. 9, inasmuch as the outer peripheral surface 41a of the tool body 41 is displaced radially inwardly of the tool body from the outermost end 7e of the insert 7, the tool body 40 can be caused to approach the corner C as if it contacted the wall of the workpiece W, whereby the width D of the uncut portion can be minimized. In addition, even though the sizes of the adjusting screws 28 or the like are changed, the diameter of the tool body 41 remains unchanged. Therefore, the sizes of the adjusting screws 28 and the configuration of the holes 27 or the like can be designed relatively freely depending upon the requirements.

In the foregoing, although the corner angle $\theta$ is set to about 45°, it may be set to about 15° to about 30° as shown in FIGS. 11 and 12.

Some modifications of the construction of the groove 31 will now be described with reference to FIGS. 13 to 17.

FIGS. 13 and 14 show a modification in which a plurality of elongated grooves 51 are formed in the outer peripheral surface of a tool body 50 so as to extend circumferentially of the tool body. Each groove 51 extends through a respective one of the holes 27 so as to be parallel to a respective one of the abutment faces 26b, and opens at its opposite ends to the adjacent two chip pockets 25.

With this construction, the forward portion disposed at a forward position with respect to the groove 51 and the rearward portion disposed at a rearward position with respect to the groove 51 are caused to deform in opposite directions. Therefore, the adjusting range by the adjusting screw 28 can be made considerably great as compared with the previous embodiments. In this embodiment, the opposite ends of the groove 51 may not be formed to open to the chip pockets 25 if the length of the groove 51 is sufficiently great.

Figure 15:
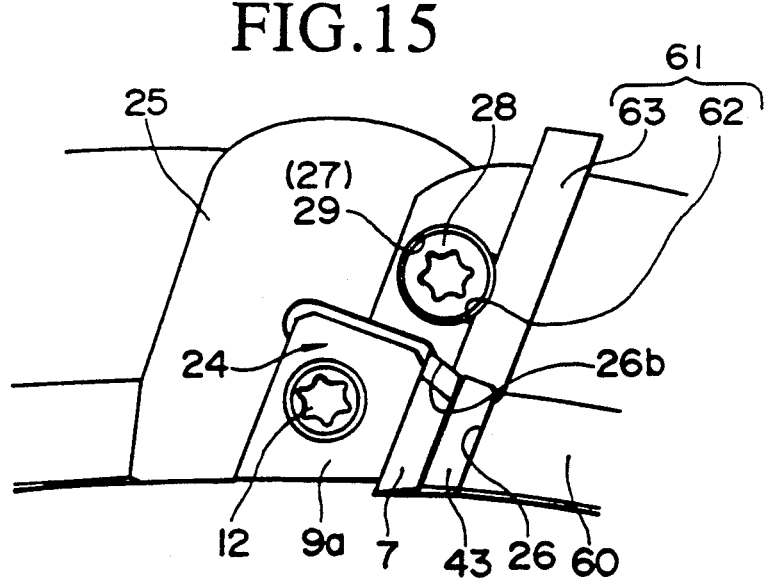
FIG. 15 is a view similar to FIG. 13, but showing yet another modification of the cutter of FIG. 6.

FIG. 15 shows another modification in which a groove 61 formed in the outer peripheral surface of a tool body 60 is comprised of a first groove portion 62 opening at its one end to the hole 27 and extending parallel to the abutment face 26b and a second groove portion 63 extending generally perpendicular to the first groove portion 62 and opening at its foremost end to the mounting recess 24.

In this embodiment, that portion of the outer peripheral surface of the tool body 60 at which the hole 27 and the adjusting screw 28 are provided is formed so as to be sandwiched between the chip pocket 25 and the second groove portion 63. Therefore, the portion around the hole 27 can be deformed more easily, so that the adjusting operation of run-out can be conducted with a reduced force.

Figure 16:
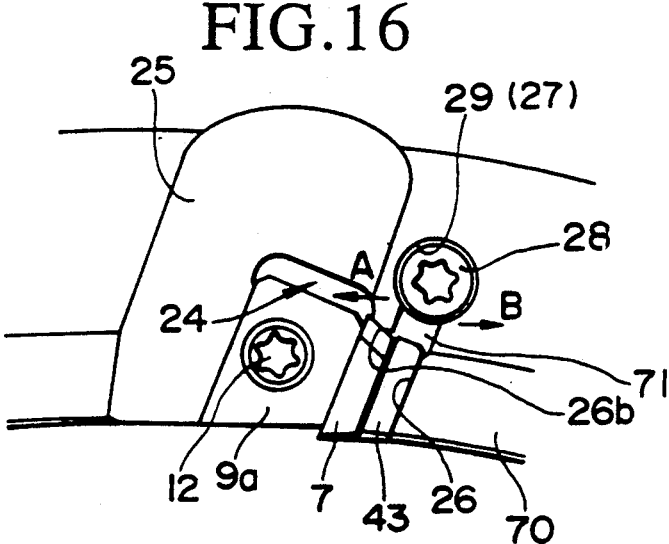
FIG. 16 is a view similar to FIG. 13, but showing a further modification of the cutter of FIG. 6.

FIG. 16 shows yet another modification in which a groove 71 formed in the outer peripheral surface of a tool body 70 extends generally in the same direction as the mounting recess 24 and the insert-receiving recess 26 in side elevation. The groove 71 opens at its one end to the hole 27 and at the other end to the mounting recess 24, and the abutment face 26b is disposed at a position displaced circumferentially forwardly in the direction of rotation from the open end of the groove 71.

Figure 17:
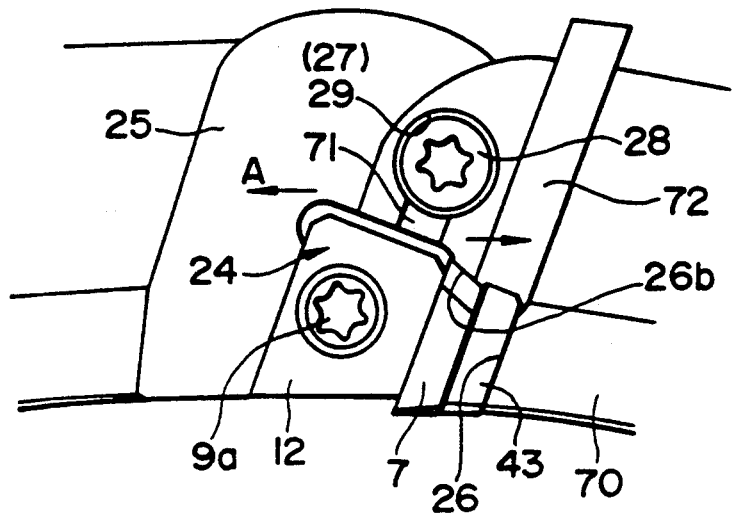
FIG. 17 is a view similar to FIG. 13, but showing a still further modification of the cutter of FIG. 6.

In this embodiment, when the adjusting screw 28 is tightened, those portions disposed adjacent to the groove 71 are deformed in opposite circumferential directions as indicated by A and B in FIG. 17, and hence the abutment face 26b presses the insert 7 axially forwardly of the tool body.

FIG. 17 shows a further modification which differs from the previous embodiment of FIG. 16 in that the abutment face 26b is formed at a position displaced circumferentially rearwardly in the direction of rotation of the tool body from the open end of the groove 71. In addition, the same second groove 72 as in the embodiment of FIG. 15 is formed adjacent to the abutment face 26b.

In this modification, when the adjusting screw 28 is tightened, those portions disposed adjacent to the groove 71 are deformed in opposite circumferential directions as is the case with that of FIG. 16, but the abutment face 26b is caused to deform axially rearwardly of the tool body. Therefore, the adjusting screw 28 must be turned in a loosening direction when moving the insert axially forwardly of the tool body.

Modifications of the construction of the hole 27 and the adjusting screw 28 will next be described with reference to FIGS. 18 to 20.

Figure 18:
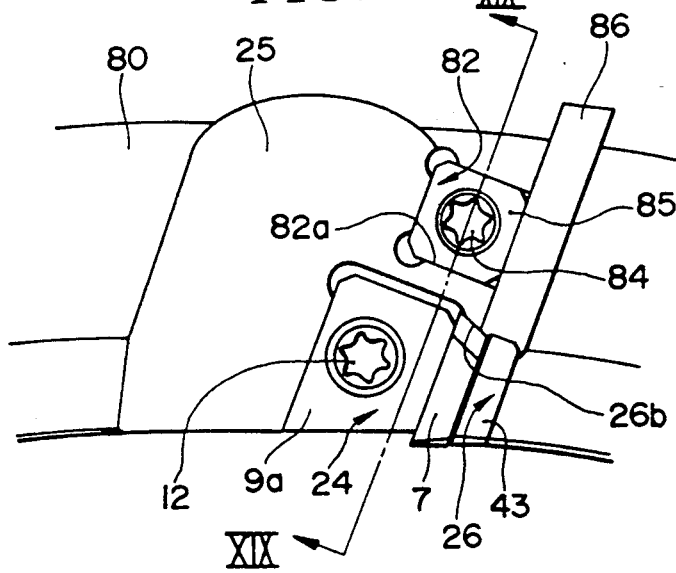
FIG. 18 is a side-elevational view showing a modification of a hole and screw arrangement.
Figure 19:
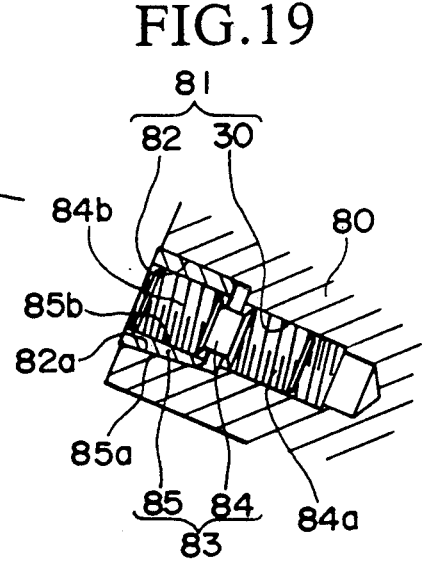
FIG. 19 is a cross-sectional view of the cutter of FIG. 18 taken along the line XIX—XIX in FIG. 18.

In a modification shown in FIGS. 18 and 19, the previous hole 27 is replaced by a hole 81 which is comprised of an aperture 82 of a non-circular cross-section such as square having a tapered face 82a extending generally parallel to the abutment face 26b and an internally threaded portion 30 extending radially inwardly of the tool body from the aperture 82. An adjusting screw 83 inserted in the hole 81 is comprised of a stud bolt 84 threadedly engaged with the internally threaded portion 30 and a wedge member 85 having a tapered face 85a and mated with the tapered face 82a of the aperture 82. A groove 86 is formed at one end of the aperture 82 so as to open to the mounting recess 24.

In the foregoing, the wedge member 85 has an internally threaded portion 85b, and the stud bolt 84 comprises an externally threaded portion 84a threadedly engaged with the internally threaded portion 30 and a follower threaded portion 84b threadedly engaged with the internally threaded portion 85b of the wedge member 85, the directions of the threads of the externally threaded portion 84a and the follower threaded portion 84b being opposite.

In this embodiment, when the stud bolt 84 is turned so that its externally threaded portion 84a is tightened, the stud bolt 84 is caused to move radially inwardly of the tool body, and the follower threaded portion 84b is loosened. Therefore, the wedge member 85 is caused to move inwardly of the aperture 82, so that the tapered face 85a of the wedge member 85 presses the tapered face 82a of the aperture 82 to deform the abutment face 26b axially forwardly of the tool body. On the other hand, if the stud bolt 84 is turned such that the externally threaded portion is loosened, the wedge member 85 is caused to move outwardly of the aperture 82, so that the abutment face 26b deforms axially rearwardly of the tool body.

With this construction, since the wedge member 85 of the adjusting screw 83 presses the entire surface of the tapered face 82a of the aperture 82 in a direction generally perpendicular to the abutment face 26b, the amount of deformation of the abutment face 26b can be increased as compared with the previous embodiments using tapered portions of a circular cross-section.

Figure 20:
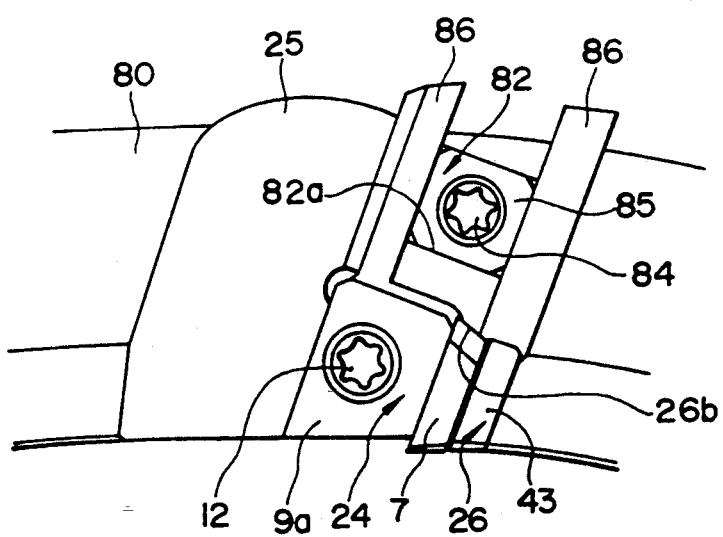
FIG. 20 is a view similar to FIG. 18, but showing another modification of the cutter of FIG. 18.

In the embodiments shown in FIGS. 18 and 19, the groove 86 is formed only at one side of the aperture 82, but it may also be provided at both sides of the aperture 82 as shown in FIG. 20.

Figure 21:
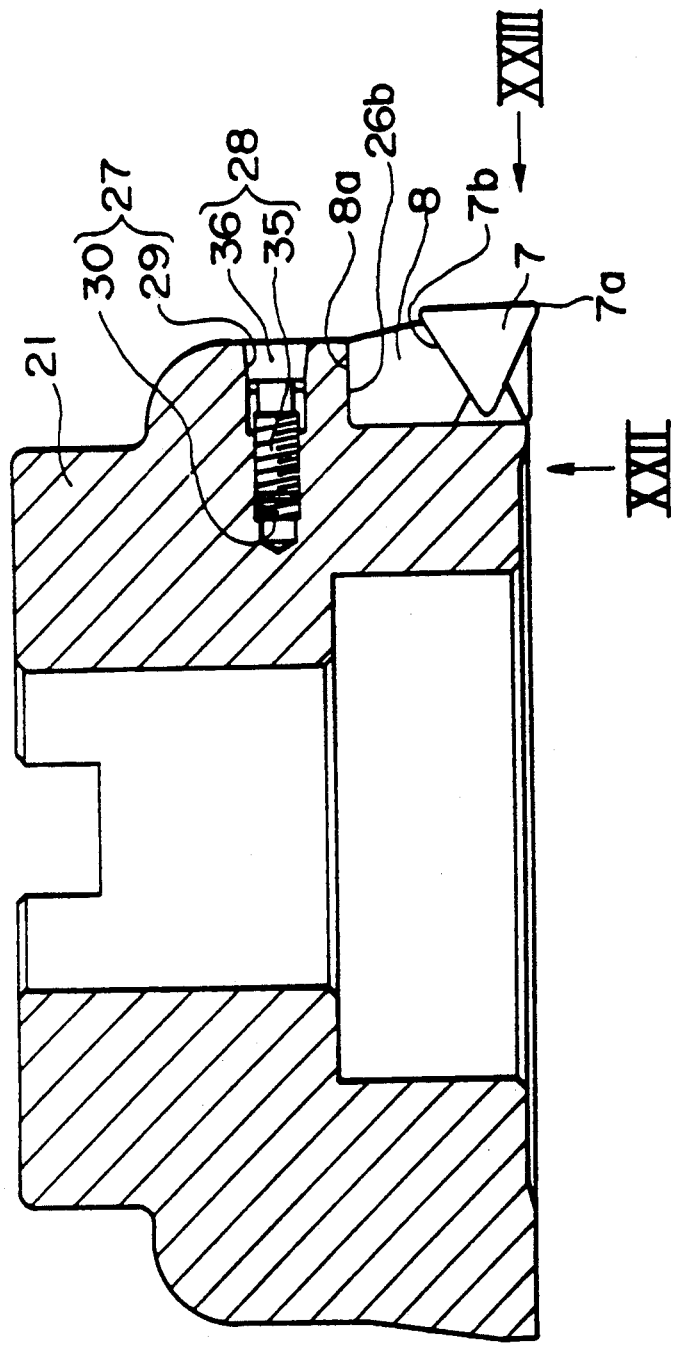
FIG. 21 is a cross-sectional view of a face milling cutter in accordance with a further embodiment of the invention.
Figure 23:
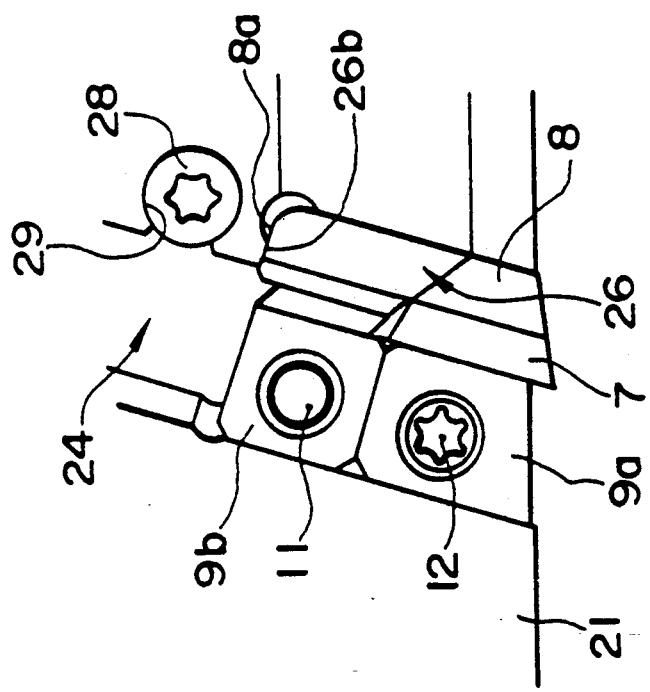
FIG. 23 is a side-elevational view of a part of the cutter of FIG. 21 as seen in the direction indicated by the arrow XXIII in FIG. 21.
Figure 22:
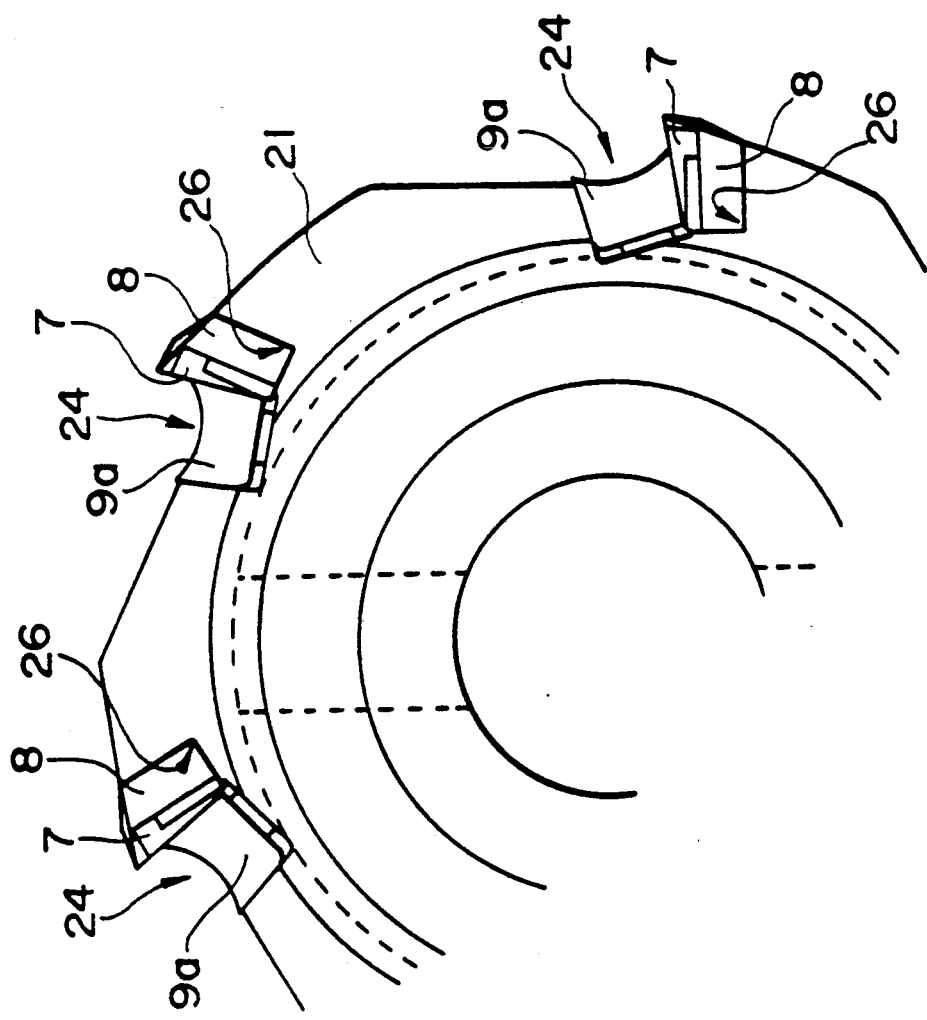
FIG. 22 is an end view of a part of the cutter of FIG. 21 as seen in the direction indicated by the arrow XXII in FIG. 21.

Furthermore, FIGS. 21 to 23 depict a further insert cutter which uses a support member 8 between the insert 7 and the insert-receiving recess 26. In this embodiment, the end face 8a of the support member 8 is held in contact with the abutment face 26b, and the insert 7 is moved axially of the tool body together with the support member 8 by turning the adjusting screw 28. In the prior art cutter, the support members of various lengths S must be prepared, but in this embodiment all of the support members 8 may have the same lengths S.

Figure 24:
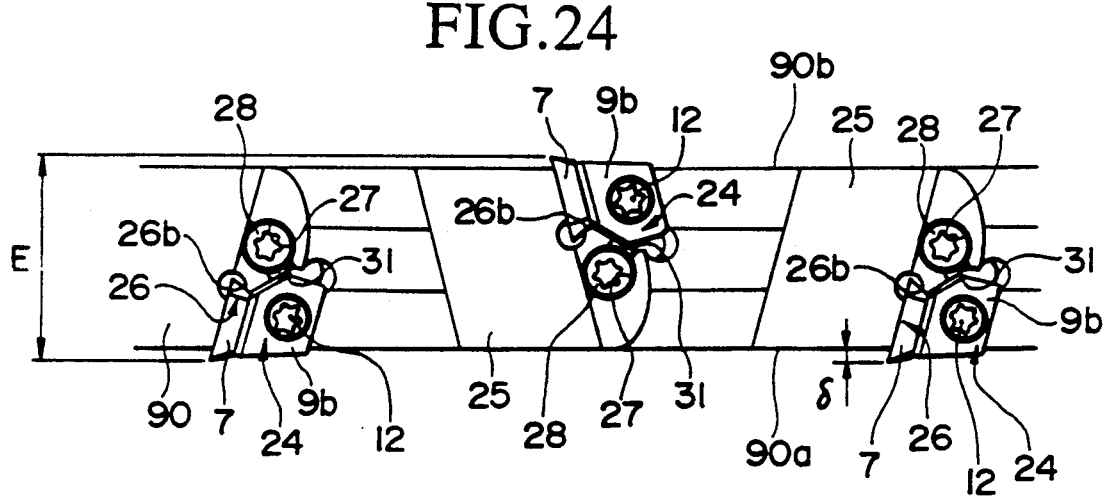
FIG. 24 is a side-elevational view of a side milling cutter in accordance with a still further embodiment of the invention.
Figure 25:
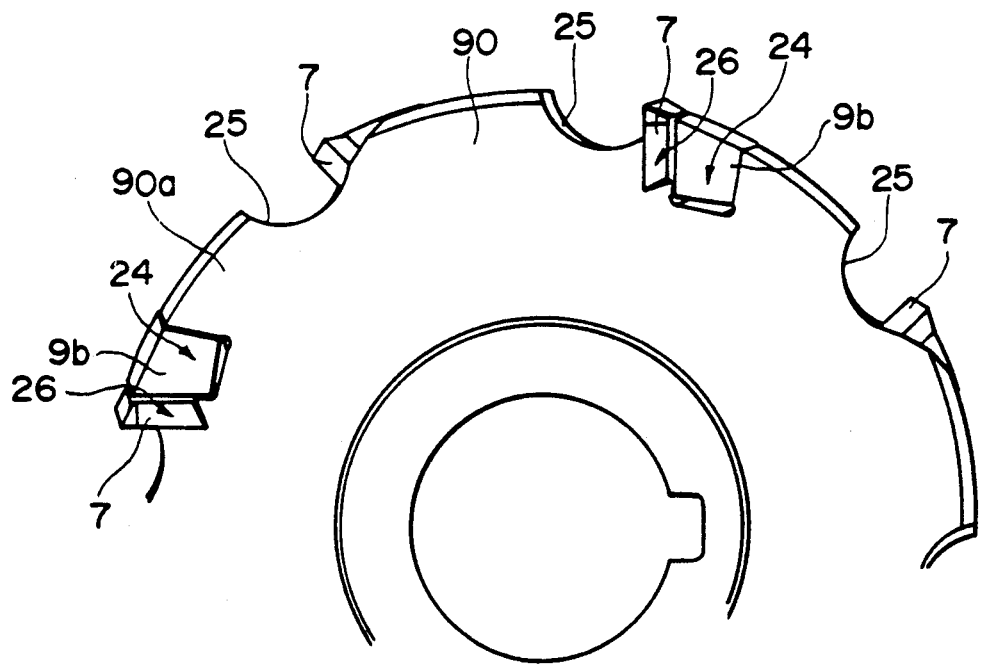
FIG. 25 is an end view of a part of the cutter of FIG. 24.
Figure 26:
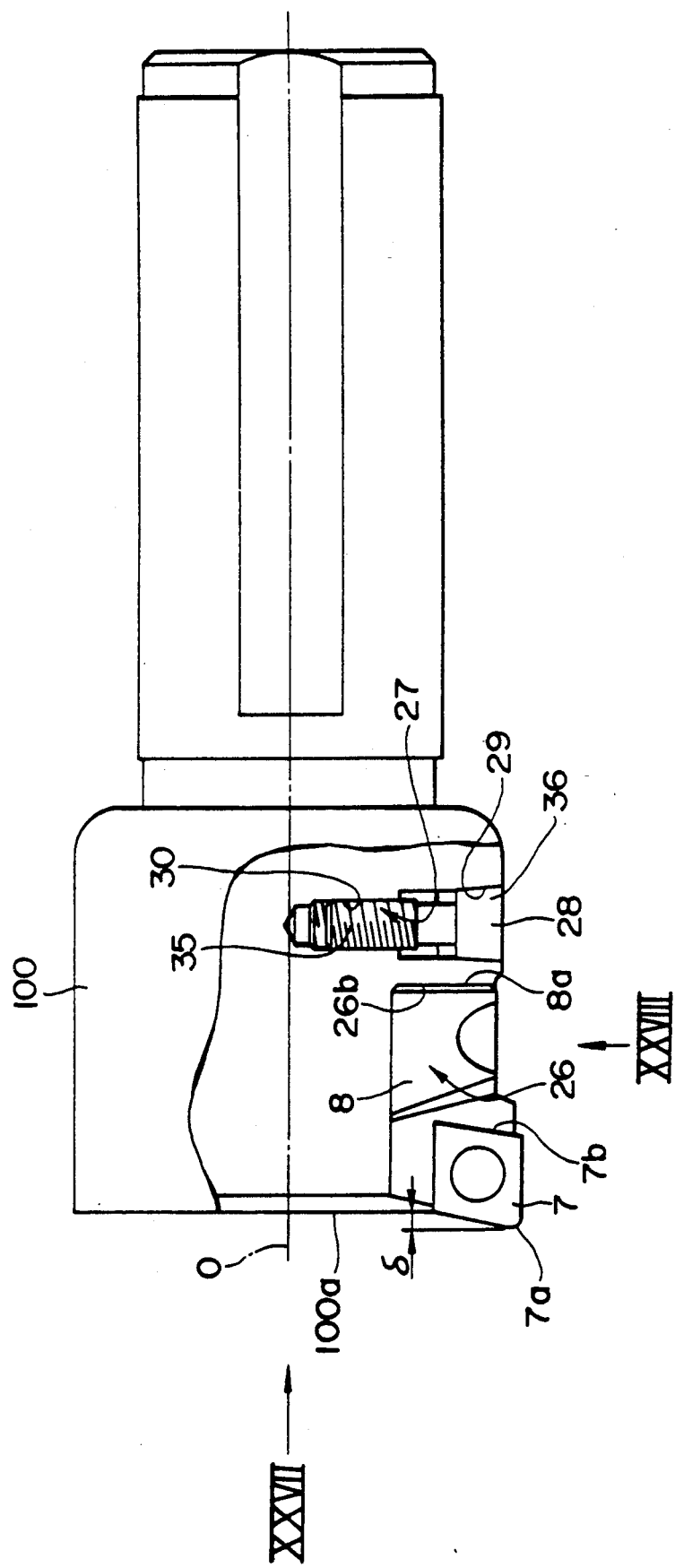
FIG. 26 is a partially cut-away side-elevational view of an end mill in accordance with a further embodiment of the invention.

FIGS. 24 to 26 show a side milling cutter in accordance with the invention, which includes a disc-shaped tool body 90 having mounting recesses 24 and insert-receiving recesses 26 formed therein. Each insert-receiving recess 26 has an abutment face 26b, and a hole 27 and an adjusting screw 26 are provided at a rearward position relative to a respective abutment face 26b. In this embodiment, the protruding amounts of the inserts 7 from the opposite end faces 90a and 90b of the tool body 90 can be adjusted by means of the adjusting screws 28, so that the width of cut E can be maintained to a desired value.

Figure 28:
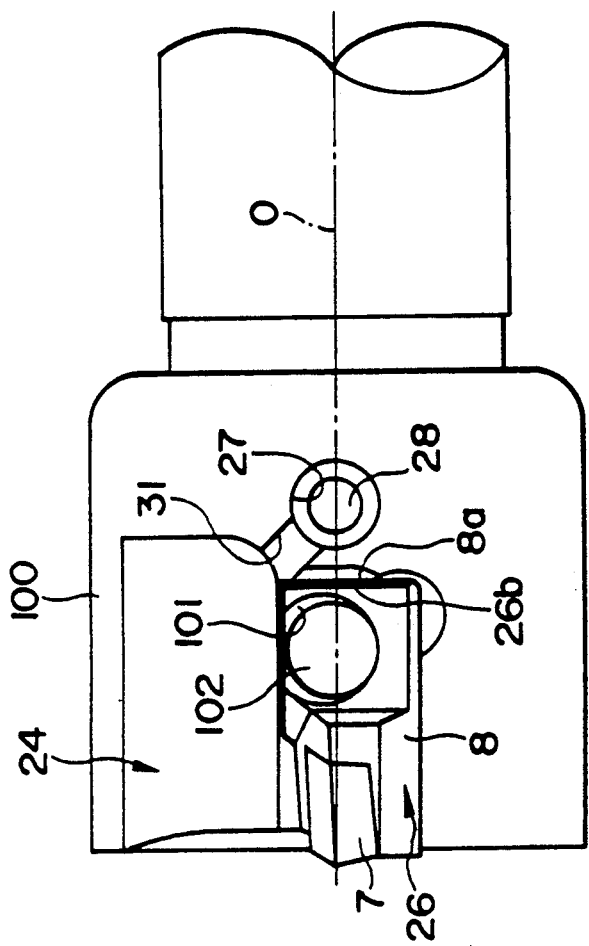
FIG. 28 is a side-elevational view of the cutter of FIG. 26 as seen in the direction indicated by the arrow XXVIII in FIG. 26.
Figure 27:
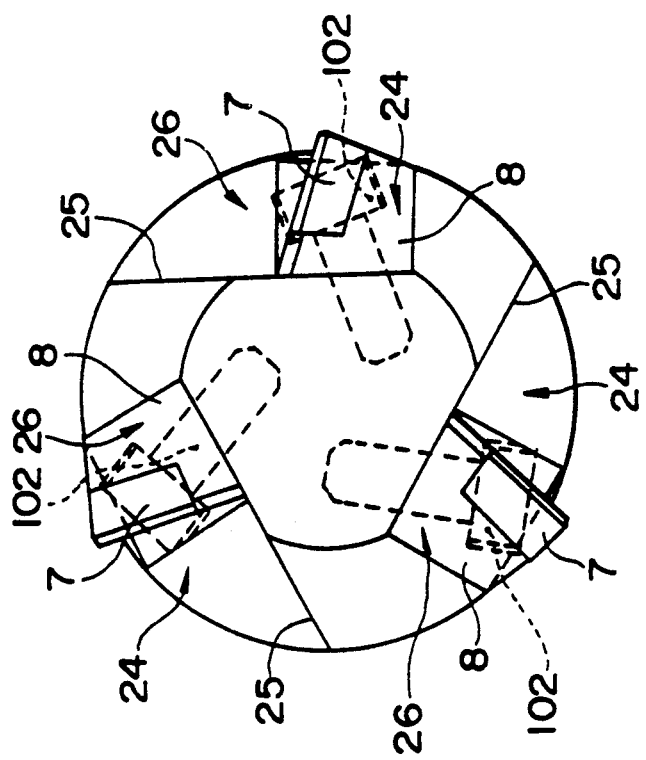
FIG. 27 is an end view of the cutter of FIG. 26 as seen in the direction indicated by the arrow XXVII in FIG. 26.
Figure 29:
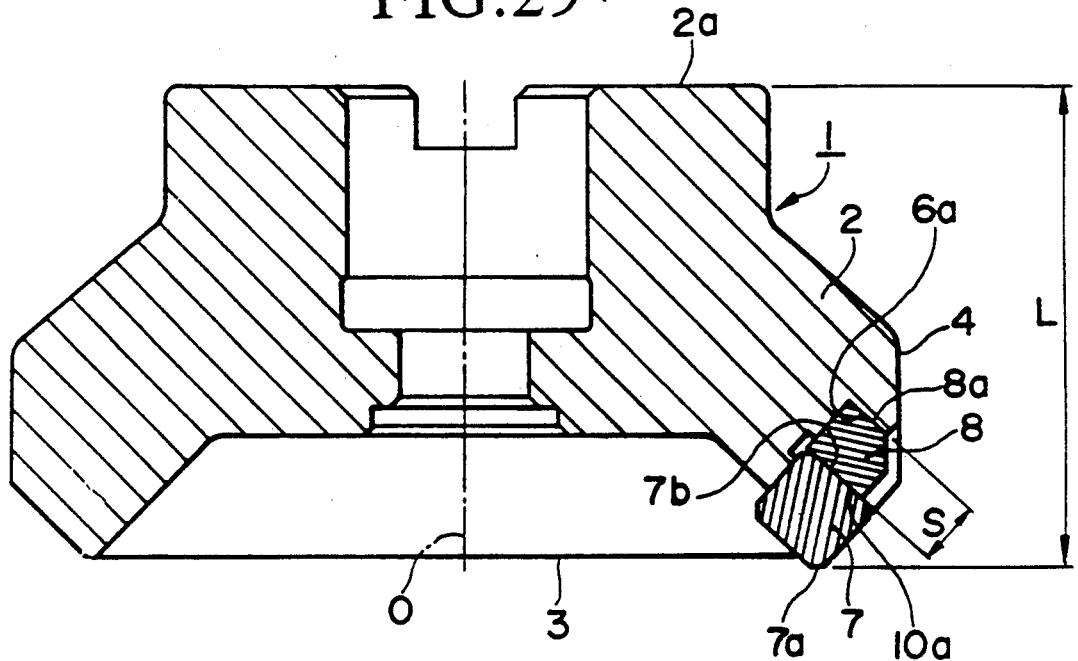
FIG. 29 is a cross-sectional view of a conventional face milling cutter.
Figure 30:
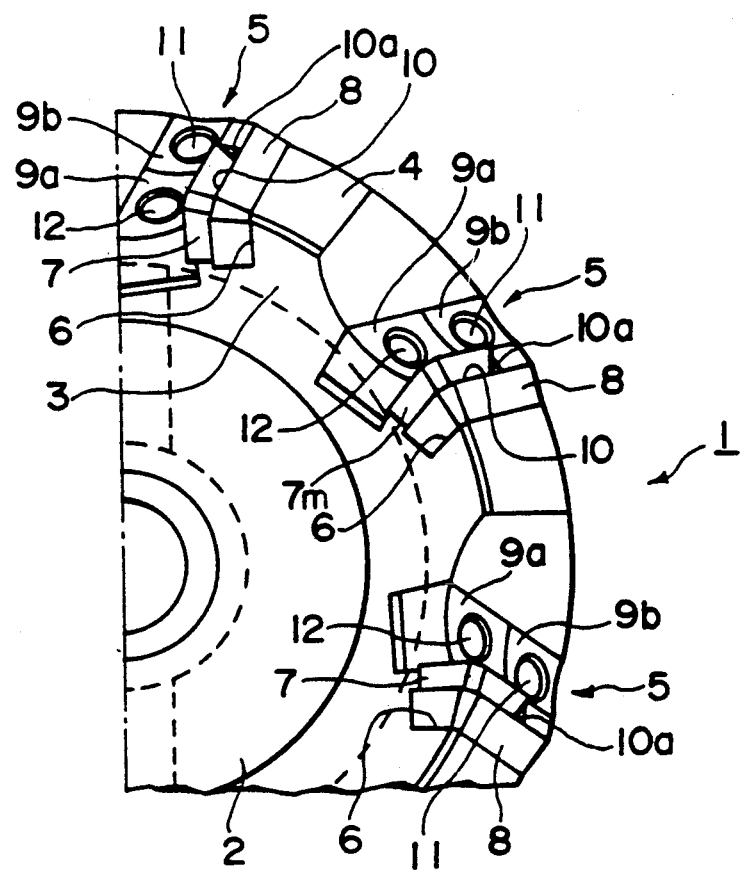
FIG. 30 is an end view of a part of the cutter of FIG. 29.

FIGS. 26 to 28 depict an end mill in accordance with the invention, which includes a generally cylindrical tool body 90 having a plurality of mounting recesses 24 and insert-receiving recesses 26 formed therein. Each insert 7 is received on a respective one of the insert-receiving recesses 24 with a support member 8 interposed therebetween. Each insert-receiving recess 26 has an abutment face 26b held in abutting contact with the end face of 8a of a respective support member 8, and a hole 27 and an adjusting screw 26 are provided at a rearward position relative to a respective abutment face 26b. In this embodiment, the protruding amounts of the inserts 7 from the forward end faces 100a of the tool body can be adjusted by means of the adjusting screws 28. In this embodiment, the support member 8 is secured to the tool body 100 by means of a bolt 102 inserted through an aperture 101 thereof. Therefore, in order to adjust the run-out of the inserts without replacing the support member 8, the aperture 101 should be formed larger in diameter than the bolt 102, or should be formed into an elongated shape extending axially of the tool body, to thereby change the position of the support member 8.

What is claimed is:

1. An insert cutter comprising:
   (a) a tool body having an axis of rotation therethrough and having a plurality of mounting recesses formed in an outer peripheral surface thereof, each of said mounting recesses defining an abutment face facing axially forwardly of said tool body; said tool body having a plurality of holes formed in the outer peripheral surface thereof and extending radially inwardly thereof, each of said holes being displaced axially rearwardly of said tool body from a respective one of said mounting recesses, each of said holes having an outer portion having an inner wall and opening to the outer peripheral surface of said tool body and an internally threaded portion extending radially inwardly of said tool body from said outer portion;
   (b) a plurality of indexable cutter inserts each releasably secured to a respective one of said mounting recesses, each of said cutter inserts having a face held in contact with said abutment face of a respective one of said mounting recesses; and
   (c) a plurality of pressing members each including a pressing portion at one end and an externally threaded portion at the other end, each pressing member being received in a respective one of said holes with said externally threaded portion being threadedly engaged with said internally threaded portion and with said pressing portions being pressed against said inner wall of said outer portion, whereby when said pressing member is screwed into said hole, said pressing portion presses said inner wall of said outer portion to cause a portion of said tool body between said hole and said mounting recess to deform elastically to thereby adjust the axial run-out of the insert.

2. An insert cutter as defined in claim 1, further comprising a plurality of support members of an identical shape and size each interposed between a respective one of said mounting recesses and a respective one of said cutter inserts.

3. An insert cutter as defined in claim 1, wherein said tool body includes a plurality of grooves each formed in the outer peripheral surface thereof so as to open to a respective one of said holes.

4. An insert cutter as defined in claim 3, wherein each of said grooves is comprised of a first groove portion opening to a respective one of said holes and a second groove portion extending generally axially of said tool body and opening to a respective one of said mounting recesses.

5. An insert cutter as defined in claim 3, wherein each of said grooves extends between a respective one of said mounting recesses and a respective one of said holes.

6. An insert cutter as defined in claim 3, wherein said tool body includes a plurality of second grooves extending generally axially of said tool body so as to be displaced circumferentially rearwardly in the direction of rotation of said tool body with respect to said hole.

7. An insert cutter as defined in claim 3, wherein each of said holes has a generally circular cross-section.

8. An insert cutter as defined in claim 3, wherein each of said holes is comprised of an aperture of a non-circular cross-section having a tapered face extending generally parallel to said abutment face and an internally threaded portion extending radially inwardly of said tool body from said aperture, said pressing member being comprised of a screw and a wedge member having a tapered face held in contact with said tapered face of said aperture, said wedge member having an internally threaded portion threaded in a direction opposite to that of the internally threaded portion of said aperture, said screw having an externally threaded portion threadedly engaged with said internally threaded portion of said aperture and a follower threaded portion threadedly engaged with said internally threaded portion of said wedge member.

9. An insert cutter as defined in claim 2, wherein at least one of said inner wall of said outer portion of said hole and said outer periphery of said pressing portion being formed so as to taper radially inwardly of said tool body.

10. An insert cutter as defined in claim 9, wherein the outer peripheral surface of said tool body in which said holes are formed is formed into a cylindrical shape displaced radially inwardly of said tool body from outermost ends of said inserts.

11. An insert cutter as defined in claim 3, wherein each of said grooves extends circumferentially of said tool body through a respective one of said holes.

12. An insert cutter as defined in claim 11, further comprising a plurality of chip pockets formed in the outer peripheral surface of said tool body so as to be adjacent to said mounting recesses, respectively, wherein each of said grooves opens at opposite ends to adjacent two of said chip pockets.

* * * * *